(12) United States Patent
Wisely et al.

(10) Patent No.: US 7,907,529 B2
(45) Date of Patent: Mar. 15, 2011

(54) COMMUNICATIONS NETWORKS

(75) Inventors: David R Wisely, Ipswich (GB); Rory S Turnbull, Ipswich (GB); Richard Gedge, Woodbridge (GB)

(73) Assignee: British Telecommunications public limited company, London (GB)

( * ) Notice: Subject to any disclaimer, the term of this patent is extended or adjusted under 35 U.S.C. 154(b) by 31 days.

(21) Appl. No.: 12/295,079

(22) PCT Filed: Feb. 28, 2007

(86) PCT No.: PCT/GB2007/000696
§ 371 (c)(1),
(2), (4) Date: Sep. 29, 2008

(87) PCT Pub. No.: WO2007/113460
PCT Pub. Date: Oct. 11, 2007

(65) Prior Publication Data
US 2009/0059811 A1    Mar. 5, 2009

(30) Foreign Application Priority Data
Mar. 30, 2006  (EP) .................................... 06251777

(51) Int. Cl.
*H04L 12/26* (2006.01)
(52) U.S. Cl. ........................ 370/235; 370/252
(58) Field of Classification Search ................ 370/252, 370/468, 230, 352
See application file for complete search history.

(56) References Cited

U.S. PATENT DOCUMENTS

| 7,644,178 | B2 * | 1/2010 | Hallenstal et al. | 709/238 |
| 2003/0016630 | A1 * | 1/2003 | Vega-Garcia et al. | 370/252 |
| 2006/0221854 | A1 * | 10/2006 | Price et al. | 370/253 |
| 2007/0115846 | A1 * | 5/2007 | Kooyers et al. | 370/252 |

FOREIGN PATENT DOCUMENTS
EP    1 475 922    11/2004

OTHER PUBLICATIONS

Tang et al. "RCS: A Rate Control Scheme for Real-Time Traffic in Networks with High Bandwidth-Delay Products and High Bit Error Rates" The Conference on Computer Communications. 20th. Annual Joint Conference of the IEEE Computer and Communications Societies. Anchorage, AK, Apr. 22-26, 2001, vol. 1 of 3. Conf. 20, pp. 114-122, XP010538691.

(Continued)

*Primary Examiner* — Kevin C Harper
*Assistant Examiner* — Henry Baron
(74) *Attorney, Agent, or Firm* — Nixon & Vanderhye P.C.

(57) ABSTRACT

In order to keep a pathway for time critical data packets (for example for VoIP calls) a dummy flow of data packets is established between a home hub router (20) and a broadband remote access server (25) being the first gateway to the IP network. Should a call be made from the telephone (23), the dummy flow is replaced for the duration of the call by the packets generated for the VoIP call. The dummy flow is adjusted by increasing or decreasing the number of data packets transmitted in order to ensure that a minimum bandwidth having a tolerable delay is available. The dummy flow works by causing non time critical (i.e. P2P data packet flows) to back off and no modification is required to routers and the like incorporated into the network.

12 Claims, 4 Drawing Sheets

OTHER PUBLICATIONS

Akyildiz et al. "Research Issues for Transport Protocols in Satellite IP Networks" IEEE Personal Communications, IEEE Communications Society, US, vol. 8, No. 3, Jun. 2001 pp. 44-48, XP011092115.

International Search Report for PCT/GB2007/000696, mailed Sep. 21, 2007.

Tang et al. "RCS: A Rate Control Scheme for Real-Time Traffic in Networks with High Bandwidth-Delay Products and High Bit Error Rates" The Conference on Computer Communications. 20th Annual Joint Conference of the IEEE Computer and Communications Societies. Anchorage, AK, Apr. 22-26, 2001, vol. 1 of 3. Conf. 20, pp. 114-122, XP010538691.

Akyildiz et al. "Research Issues for Transport Protocols in Satellite IP Networks" IEEE Personal Communications, IEEE Communications Society, US, vol. 8, No. 3, Jun. 2001 pp. 44-48, XP011092115.

* cited by examiner

COMMUNICATIONS NETWORKS

This application is the U.S. national phase of International Application No. PCT/GB2007/000696 filed 28 Feb. 2007 which designated the U.S. and claims priority to EP 06251777.6 filed 30 Mar. 2006, the entire contents of each of which are hereby incorporated by reference.

BACKGROUND

1. Field

Example embodiments of the present invention relate to connectionless communications networks and more particularly to such networks in which bandwidth is shared between users.

2. Description of Related Art

One of the most significant problems affecting users of Internet Protocol Networks (IP Packet Networks) is a lack of guaranteed quality of service (QoS), such that while it is possible to make VoIP calls for example, packet delays may cause the quality of the call to be poor.

There is a further difficulty in that file sharing can cause delays in the initial establishment of a VoIP call because peer to peer file sharing networks will use all of the available bandwidth in order to try to speed up the transfer of files even although they may be of relatively low priority.

Thus congestion on the network is a significant difficulty particularly for two way VoIP or video calls because delayed or dropped packets cannot be re-sent since they only have a time-useful window of around 300 msec (voice). Consequently as network usage off the backbone or M-bone increases and localised wireless network schemes "piggyback" on home routers, high priority or time-critical transmissions need to be protected.

There have been attempts to introduce protection for time critical transmissions but most involve complex modifications of routers and other network common equipment to perform. One example of this is to be found in EP0706297 which describes a method of controlling congestion in an ATM switch. In order for the method described in this specification each router in the network would require modification. The method provides a rigid congestion control scheme which would in practice have no effect on UDP:TCP traffic ratios and would simply be at maximum congestion where peer- to peer traffic was high.

Another known scheme is disclosed in US2004/0172464. This provides for the establishment of two QoS classes between two sites, in practice probably two linked business locations. The scheme is implemented by having an admission control algorithm at the two end points of the pipe between the two locations which effectively reserves a part of the pipe (effectively a virtual leased line) for real time traffic. There is a requirement for imposing a rigid QoS allocation and may be a requirement for Gateway or router modification at the two end points.

There are other solutions proposed to the problem of ensuring time critical packets over IP networks have priority including using underlying network bearers such as ATM or MPLS, using deep packet inspection techniques, service prioritisation, end-to-end congestion notification schemes and, in the extreme, over provisioning of the network.

All of these solutions have significant cost o complexity issues associated with them requiring changes to deployed routers or protocol modifications, moving the problem from the IP layer 9 which in turn reduces the advantages of using IP) or is costly when traffic flows rise. Deep Packet inspection methods have the additional disadvantage of failing to work when packets are encrypted.

Since most of the QoS issues in public IP networks arise from peer to peer traffic, the flows filling up to network capacity regardless of available bandwidth, operators face difficulties offering voice and video services without introducing a QoS scheme because P2P traffic will adversely affect these services without being particularly adversely affected themselves.

BRIEF SUMMARY OF PRESENT EXAMPLE EMBODIMENTS

According to example embodiments of the present invention there is provided a method of reserving bandwidth in a shared communications network comprising the steps of:

transmitting a stream of dummy data packets at a predetermined rate between a first node and a second node of the network;

receiving a corresponding stream of dummy data packets transmitted by the second node to the first node;

determining the delay and/or packet loss between the two nodes;

comparing the delay and/or loss with a threshold below which the quality of service is insufficient for subsequent time critical traffic; and if the quality of service is insufficient, increasing the transmission rate of dummy data packets between the nodes.

The transmission of dummy data packets between the nodes may occur at predetermined times at which higher traffic congestion is expected and/or may occur at predetermined times in advance of times at which time critical traffic is expected to originate at one of the nodes.

According to a feature of the invention there is provided a communications system comprising a shared communications network in which control means in one node of the system establishes a guaranteed path to at least one other node of the system by transmitting a stream of dummy data packets to the at least one other node and receives a corresponding stream of dummy data packets from said other node, the control means determining delay and/or packet loss in the transmissions and increasing the transmission rate of dummy data packets if the quality of service falls below a pre-determined threshold for satisfactory transmission of time critical data packets.

The transmission of dummy data packets between the nodes may occur at predetermined times at which higher traffic congestion is expected and/or may occur at predetermined times in advance of times at which time critical traffic is expected to originate at one of the nodes.

On detection of the origination of a time critical data packet stream originating in said one node, the control means may cause the substitution of time critical packets for the dummy data packets and on completion of the transmission of the time critical data stream, may cause the transmission of dummy data packets to re-commence.

BRIEF SUMMARY OF THE DRAWINGS

A communications network in accordance with the feature of the invention and using the method of the invention will now be described by way of example only with reference to the accompanying drawings of which.

DETAILED DESCRIPTION OF PRESENT EXAMPLE EMBODIMENTS

Figure 4:
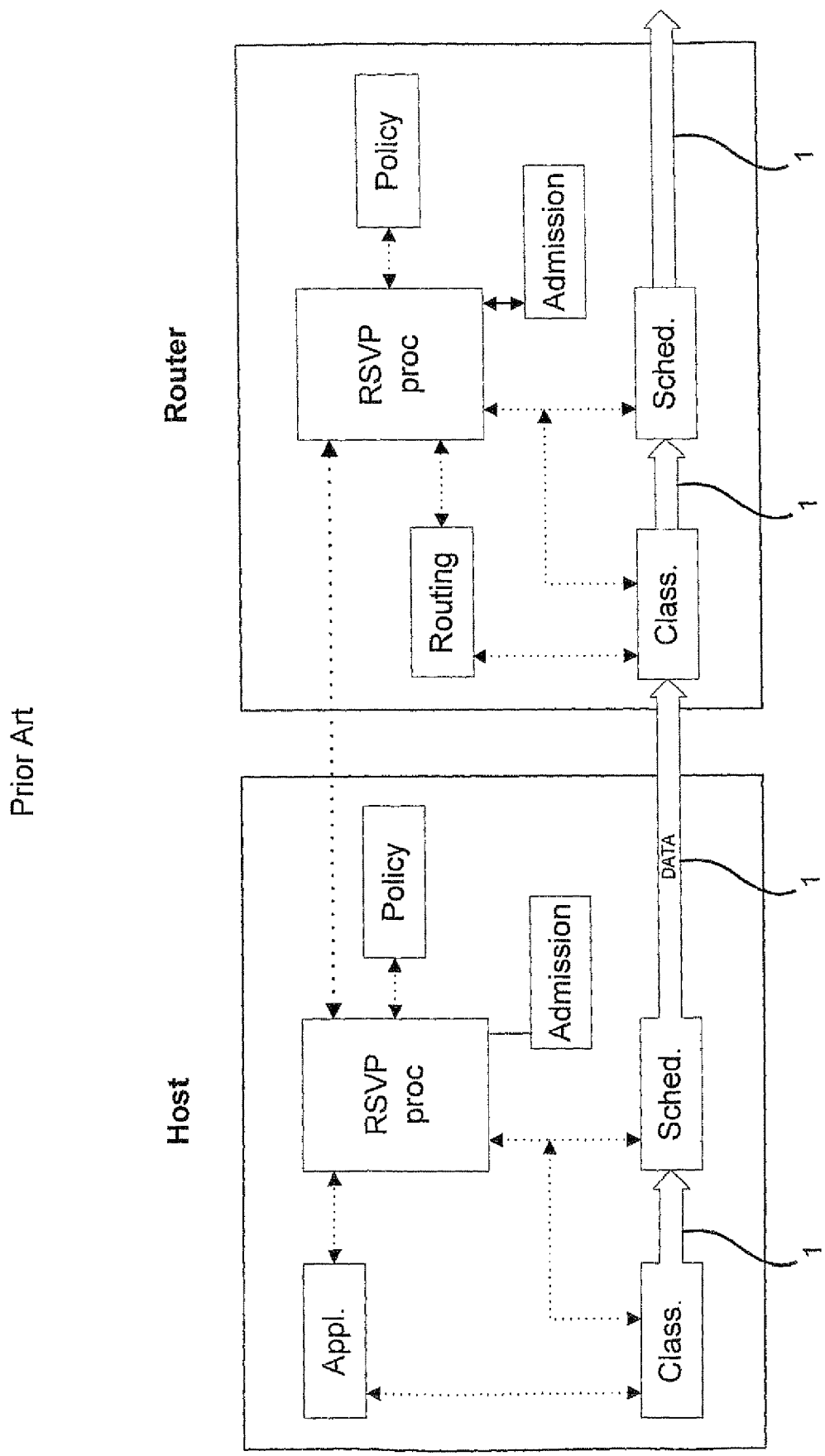
FIG. 4 is a block schematic diagram of a prior art scheme.

Initially we shall continue to look at one prior art solution sometimes referred to as the IETF IntServ system which is a circuit emulation scheme. This scheme sets up a specific path for the packet flow in contrast to the normal principle that packets should flow through any number of different routes. Referring then to FIG. 4, each router that exists on the data path 1 must reserve a specific bandwidth for the flow. The flow specifications are signalled through the network using RSVP protocol and each router is required to run specific software (requiring that the router must be modified) and set up a number of queues which requires extra processing and router memory. The schema is difficult to manage in large networks and if any router runs out of bandwidth the reservation attempt will fail.

A complex system of bandwidth co-ordination is required and the delay in setting up a reservation can be very long resulting in post dialing delay for users on VoIP calls for example. There are also serious problems when trying to scale up the scheme to larger networks.

Figure 1:
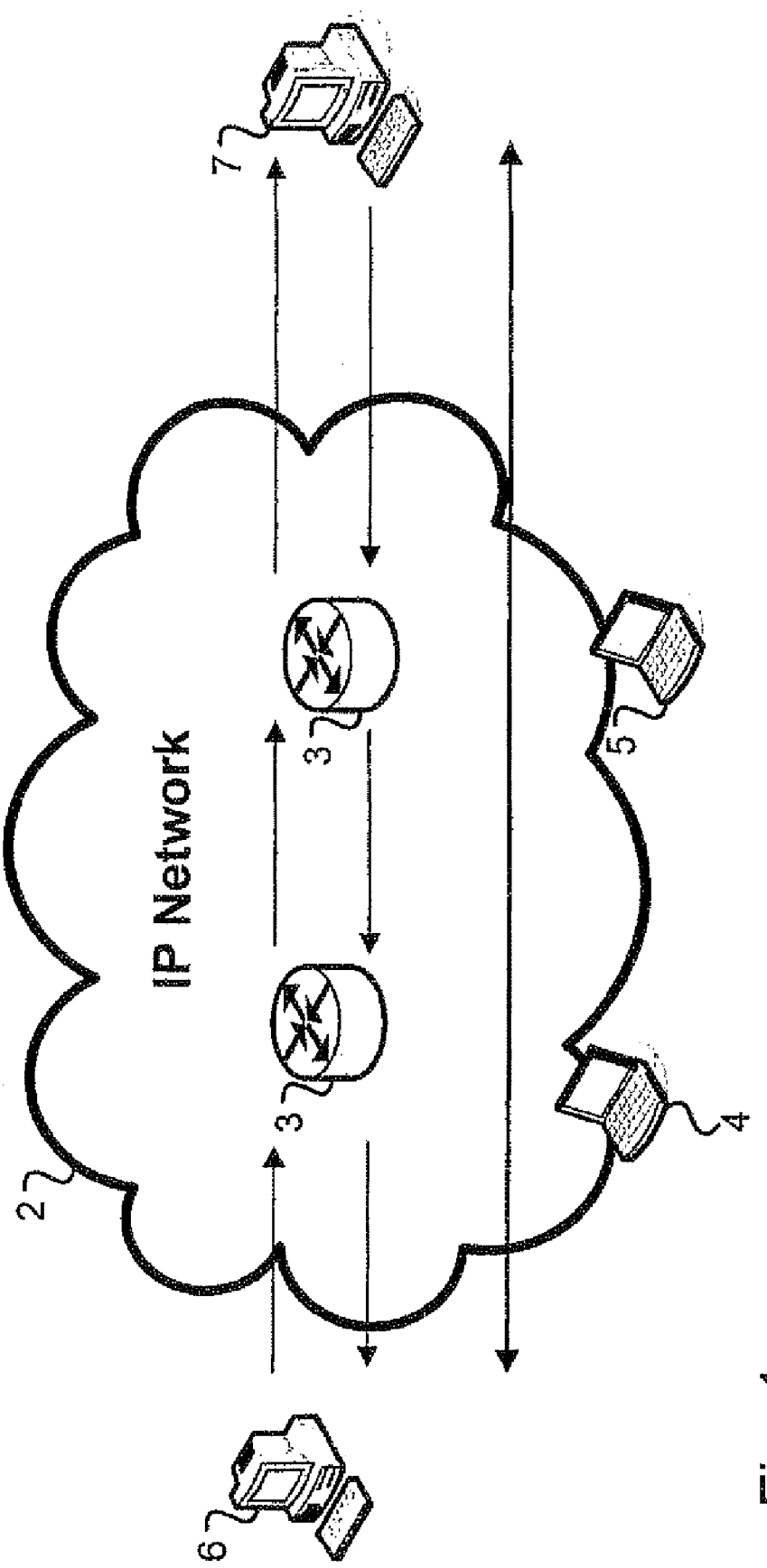
FIG. 1 is a simplified overview of implementation in an IP network.

Now referring to FIG. 1, the present invention provides a simple solution to the problem of ensuring that a user has available bandwidth where there is a requirement for some guarantee of minimal packet delay. Thus, an IP network 2 comprising a number of routers 3 (only two of which are shown for simplicity) may be subject to congestion due to P2P traffic for example caused by other network users 4,5.

Assuming that a first user terminal 6 needs a guaranteed path to a second user terminal 7 then the terminal 6 commences transmission of a series of data packets. Over time this data packet flow causes lower priority (for example P2P) data packets to back off as a result of the congestion. This can take some time to occur so that establishing the dummy data packet flow in advance of requiring a guaranteed flow ensures that a pathway is established between terminals 6 and 7 in advance of requiring time critical data packet transmissions. Thus when the user of terminal 6 requires a guaranteed flow, the time critical packets are substituted for the dummy data packet flow which works much better that trying to establish a flow for time critical data packets when it is needed in a congested network.

Thus because the dummy flow restricts the P2P traffic, which would otherwise consume all of the available bandwidth, it is possible to establish a voice or video call from scratch without introducing a significant delay while waiting for the P2P traffic to back off.

FIG. 1 shows the concept of example embodiments of the invention in its simplest form and because it is based at the terminal nodes 6,7 which run special network software which sits above the normal TCP/IP stack, no modification of routers or other network components is required.

Figure 2:
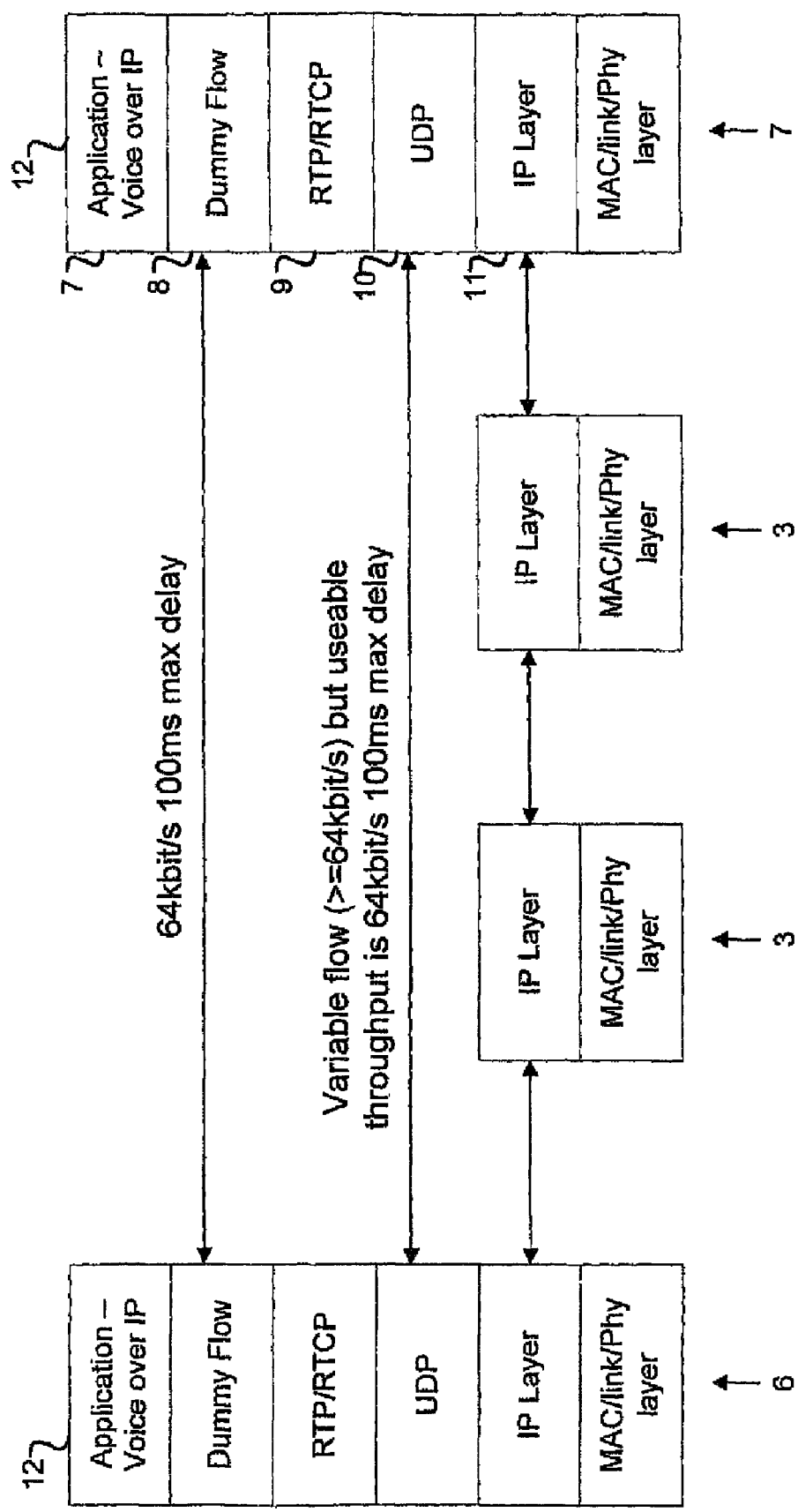
FIG. 2 shows schematically the network layers used.

Thus referring to FIG. 2, the only adaptation required to implement the invention is to modify the end points between which dummy flows are to be established. The dummy flow application 8 sits above the TCP/IP stack using RCP/UDP as in normal packet flows monitoring the 64 kb/sec flow for delay of 100 mS maximum and adjusting the packet transmissions to ensure that this flow rate is maintained. This is done using the RTCP feedback as is usual for real time flows and no modification of the operation of the RTP/RTCP layer 9 is necessary.

So the UDP layer 10, IP layer 11 and the physical layer are not altered by the implementation and the monitoring of the RTCP response allows the application to increase the rate of transmission as necessary above 64 kBits/sec to ensure that P2P traffic backs off from the congested path and the interface between the dummy flow layer 8 and application interfaces such as VoIP application 12 can use the established path instantly without waiting for other congestion causing traffic flows to cease.

Figure 3:
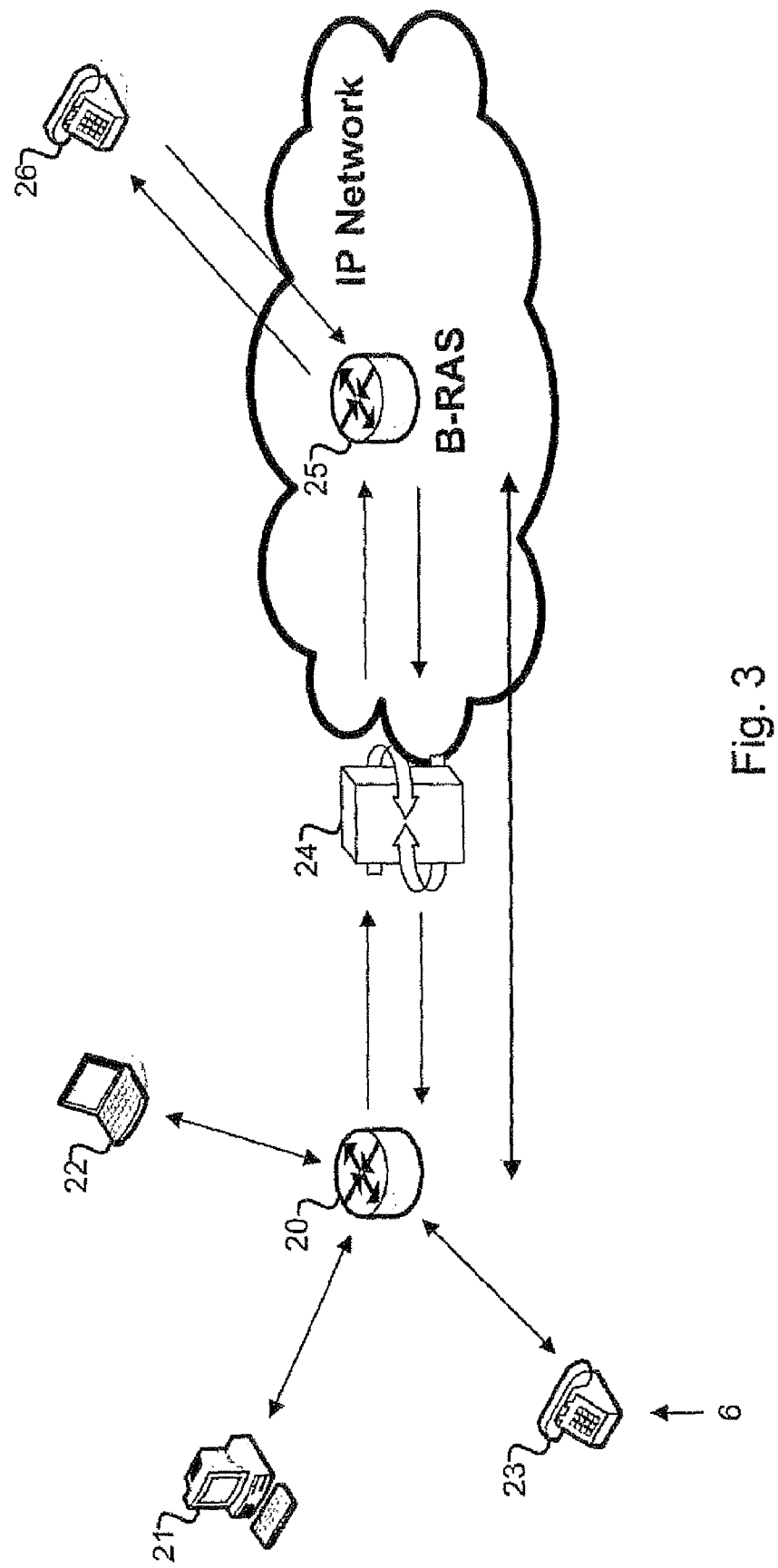
FIG. 3 is a block schematic diagram showing the use of example embodiments of the invention in a DSL or ADSL communications environment.

To consider an example of the benefits of example embodiments of invention, refer now to FIG. 3 which shows a part of a VoIP network which is shared with other so-called broadband traffic. A router or DSL modem 20 (which is sometimes referred to as a "Home Hub") may be shared by a number of computers 21, 22 for example, and a home telephone 23. Other apparatus such as home video recorders (not shown) may also be using the home hub in non time-critical downloading and devices such as emergency alarms may use the home hub to link to emergency services in time critical communications mode.

In many DSL Broadband connections, the up-link bandwidth may be significantly narrower than the downlink bandwidth, typical variation in ADSL being 256 kBit/s up-link with 2 MBit/s down link. Thus if any user in the household (for example downloading a film for later viewing to a recorder) is using all of the up link or downlink for non time critical communications then any attempt to make a voice call from the telephone 23 using the same DSL link will fail.

Now by establishing a dummy flow between the router 20 and, say a broadband remote access server (B-RAS) 25 by way of the connection and a digital subscriber line application multiplexer (DSLAM) 24 (which is not affected by the implementation, nor requires any modification for example embodiments of the invention to perform), a guaranteed path for time critical packets is available and the kind of "instant telephony" which we have come to accept as part of the POTS aspect of the PSTN can continue to be provided without requiring a different line for telephony and broadband applications.

With the route to the B-RAS 24 guaranteed, being the first gateway between the customer and the IP network, delays in setting up immediate telephone or video calls can be prevented so that a call between telephone 23 and telephone 26 is not adversely affected by other IP traffic between the router 20 and the B-RAS 25.

While example embodiments of the invention have been described with reference to specific values of dummy flow traffic, it will be appreciated that in dependence on the kind of traffic anticipated higher or lower guaranteed flows of traffic may be provided. Similarly at the same time as the guaranteed packet flow is taken over by the application layer 12, a new dummy flow may be started to cause back off of other non-time critical packets in preparation for a further real time application starting while the first flow is in use.

The dummy flow application may, only run at times of heavy traffic, or at predetermined times when the home hub 20 is expected to be congested. Thus the dummy flow application 8 may only run during pre-set hours which may be varied by time of day/day of week or by including learning of likely times of congestion at the home hub 20.

The method can be applied not only to domestic (Home Hub) applications but may equally be implemented in any kind of LAN, wireless network etc. In particular where community sharing of wireless networking is used, the wireless router owner may require a guaranteed communications flow for his own time critical packet flows and need to force P2P traffic to back off during business hours for example.

The invention claimed is:

1. A method of reserving bandwidth in a shared communications network comprising the steps of:
    transmitting a stream of dummy data packets at a predetermined rate between a first node and a second node of the network;
    receiving a corresponding stream of dummy data packets transmitted by the second node to the first node;
    determining the delay or packet loss between the nodes;
    comparing the delay or packet loss with a threshold below which the quality of service is insufficient for subsequent time critical traffic; and if the quality of service is insufficient, increasing the transmission rate of dummy data packets between the nodes; and
    on detection of the origination of a time critical data packet stream between the first node and the second node, causing the time critical packets to be substituted into the stream and the corresponding stream in place of the dummy data packets.

2. A method according to claim 1 in which the transmission of dummy data packets between the nodes occurs at predetermined times at which higher traffic congestion is expected.

3. A method according to claim 1 in which the transmission of dummy data packets between the nodes occurs at predetermined times in advance of times at which time critical traffic is expected to originate at one of the nodes.

4. A communications system comprising a shared communications network in which a controller in one node of the system establishes a guaranteed path to at least one other node of the system by transmitting a stream of dummy data packets to the at least one other node and receives a corresponding stream of dummy data packets from said other node, the controller determining delay or packet loss in the transmissions and increasing the transmission rate of dummy data packets if the quality of service falls below a pre-determined threshold for satisfactory transmission of time critical data packets; and
    on detection of the origination of a time critical data packet stream between the one node and the at least one other node, the controller is operable to cause the time critical packets to be substituted into the stream and the corresponding stream in place of the dummy data packets.

5. A communications system according to claim 4 in which the controller causes transmission of dummy data packets at predetermined times when congestion between the selected nodes is anticipated to be high.

6. A communications system according to claim 4 in which the controller causes the transmission of dummy data packets between the nodes at predetermined times in advance of times at which time critical traffic is expected to originate at one of the nodes.

7. A communications system as claimed in claim 4 in which, on completion of the transmission of the time critical data stream, the controller causes the transmission of dummy data packets to re-commence.

8. A communications system as claimed in claim 4, in which one of the nodes is a shared domestic router and the controller resides in a terminal attached thereto.

9. A communications system as claimed in claim 8 in which the shared domestic router is a wireless hub.

10. A communications system as claimed in claim 9 in which the wireless hub carries VoIP telephone calls.

11. A communications system as claimed in claim 4, in which one of the nodes is a broadband remote access server.

12. A method according to claim 1, further comprising re-commencing the transmission of dummy data packets on completion of the transmission of the time critical data stream.

* * * * *